United States Patent
Kühmayer et al.

(10) Patent No.: US 6,488,048 B2
(45) Date of Patent: Dec. 3, 2002

(54) EXPLOSION RELIEF VALVE

(75) Inventors: Johannes Kühmayer, Vienna (AT); Johannes Besau, Vienna (AT)

(73) Assignee: Hoerbiger Ventilwerke GmbH, Vienna (AT)

(*) Notice: Subject to any disclaimer, the term of this patent is extended or adjusted under 35 U.S.C. 154(b) by 0 days.

(21) Appl. No.: 09/934,585

(22) Filed: Aug. 23, 2001

(65) Prior Publication Data

US 2002/0000249 A1 Jan. 3, 2002

Related U.S. Application Data

(63) Continuation of application No. 09/421,930, filed on Oct. 21, 1999, now abandoned.

(30) Foreign Application Priority Data

Oct. 21, 1998 (AT) .............................................. 1766/98

(51) Int. Cl.$^7$ ..................... F16K 15/02; B65D 90/22
(52) U.S. Cl. ................. 137/540; 137/550; 220/88.2
(58) Field of Search ................... 137/550, 540; 48/192; 220/88.2, 88.1; 222/189.01

(56) References Cited

U.S. PATENT DOCUMENTS

| | | | | |
|---|---|---|---|---|
| 1,826,487 A | * | 10/1931 | Wiggins | 48/192 |
| 3,182,647 A | * | 5/1965 | Bintz | 123/119 |
| 3,248,188 A | * | 4/1966 | Chute | 48/192 |
| 3,287,094 A | * | 11/1966 | Brownell | 48/192 |
| 3,567,536 A | * | 3/1971 | Wickersham, Jr. | 428/911 |
| 3,661,295 A | * | 5/1972 | Grunwald et al. | 220/88.2 |
| 3,903,646 A | * | 9/1975 | Norton | 48/192 |
| 4,149,649 A | * | 4/1979 | Szego | 220/88.2 |
| 4,405,076 A | * | 9/1983 | Lines, Jr. et al. | 229/3.5 MF |
| 4,975,098 A | * | 12/1990 | Lee et al. | 48/192 |

* cited by examiner

Primary Examiner—John Rivell
(74) Attorney, Agent, or Firm—Dykema Gossett PLLC

(57) ABSTRACT

An explosion relief valve for a confined space, more particularly for the crankcase of an internal combustion engine, includes a seat (1) which may be fitted into a boundary wall (3) of the space to be protected, a spring-loaded closure plate (4) cooperating with the valve seat, at least one flame barrier (9) having low pressure resistance in the gas path leading through the valve, preferably consisting of sheet-metal strips stacked one above another transversely to the throughflow direction of the gas, which sheet-metal strips are provided preferably at least over part of their width with irregular corrugations, and at least one other perforated wall (11, 12) in the gas path of expanded metal.

20 Claims, 3 Drawing Sheets

EXPLOSION RELIEF VALVE

This application is a Continuation of application Ser. No. 09/421,930, filed Oct. 21, 1999, now abandoned.

BACKGROUND OF THE INVENTION

1. Field of the Invention

The invention relates to an explosion relief valve for confined spaces, volumes or vessels, and more particularly for the crankcase of internal combustion engines, which includes a valve seat which may be fitted into a boundary wall of the space to be protected, a spring-loaded closure plate co-operating with the valve seat and at least one flame barrier having low pressure resistance installed in a gas path leading through the valve, which flame barrier preferably consists of sheet-metal strips stacked one above another transversely to the throughflow direction of the gas, which sheet-metal strips are preferably provided at least over part of their width with irregular corrugations, and at least one other perforated wall in the gas path.

2. The Prior Art

A valve of this kind is described in DE 1 126 676 C and GB-A-2 017 269. Two flame barriers, one disposed behind the other, are provided in the relief valves described therein, the British publication disclosing the combination of a sheet-metal ring stack with expanded metal fabric layers disposed thereafter. However, there is no mention whatsoever in that publication of structures which increase the mechanical stability and/or of affecting the flow characteristic.

A valve of an even simpler design is described in AT 311 129 and has very low conductance, a heat absorption capacity sufficient to prevent flames from passing through the valve being achieved without the application of vaporizable substances by means of the sheet-metal strips acting like cooling ribs. On the other hand, however, because of the substantially parallel sheet-metal strips, the flow resistance is not inadmissibly increased and the gas is able to flow away in a linear manner, with the result that the overpressure in the space protected by the valve can easily be reduced.

Particularly important as fields of application for explosion relief valves of this kind are the protection of confined spaces such as, for example, the crankcases of two-and four-stroke diesel engines, gas containers, fairly large pipelines and other spaces in which explosive substances are stored or in which highly inflammable gases may form. Several of the relief valves described may also be provided in parallel or in series.

It is desirable to provide a valve of the type specified in the introduction, in which a flame front is in every case reliably prevented from passing through the explosion relief valve for all fields of application, the throughflow of the valve is optimized, and the valve is also protected against mechanical damage, even after repeated explosions.

SUMMARY OF THE INVENTION

According to the invention, the perforated wall is made of an expanded metal strip. This material offers the facility of controllably influencing the flow behavior, and the shape and location of the lozenge-shaped openings of the expanded metal and the alignment of the webs can be selected depending on the influence desired. The corresponding uniform turbulence enables the cooling capacity of the flame barrier to be optimally utilized without excessively increasing the flow resistance. As well as making the flow through the other expanded metal perforated wall more uniform, the characteristics of the frame front, if applicable, are changed in such a way that no sparks form in closely confined areas, but rather distribution takes place over a larger area with the result that the heat absorption capacity of the flame barrier is better utilized and no local overloads are able to occur. The time taken for the flame front to pass through the valve is also thereby increased. The passing of any flames through the valve can thus be reliably prevented. Diesel and gas engines protected with the valve according to the invention can therefore also be used in hazardous areas, and/or complicated above-roof pressure and flame outlets are no longer necessary, and the non-hazardous relief of pressure into the working space is possible. The expanded metal of the valve construction provides greater mechanical strength, on the other hand, enabling even repeated explosions to be withstood without deformations occurring which adversely affect operation, the valve remaining fully effective and operational. This is of great economic significance as the overriding majority of ships today are built without redundancy and the failure of the one and only engine may have dire consequences.

The effect of influencing the flow for improved utilization of the cooling capacity of the flame barrier is revealed particularly clearly if at least one expanded metal wall is positioned immediately in front of the first flame barrier.

According to another optional feature of the invention, on the other hand, at least one perforated wall may be positioned immediately after the last flame barrier.

According to another optional feature of the invention, at least one flame barrier and a perforated wall may be positioned behind the valve seat. As a result the first pressure peaks are caught by the closure plate of the valve before they impinge on the first flame barrier and/or perforated wall, which are thereby better protected from damage.

In order to achieve a directed gas flow after its exit from the explosion relief valve, the perforated wall is preferably made of expanded metal and its webs are set in such a way that the gas flow emerging from the valve is directed at the surface of the space to be protected. This means that even in the most confined conditions, danger to operating personnel may be prevented to the greatest possible extent and without great effort.

With the advantage of structural simplicity, the saving of weight and the low space requirement, the valve behind the last flame barrier can be free of any deflecting devices for the emerging gas flow. On the other hand, if there is available space provision, the valve may be larger in size and thus be more reliable in operation and/or suitable for higher explosion pressures.

Advantageously, according to another optional feature of the invention, at least one flame barrier may be annular and permit throughflow over substantially 360° and at least one additional perforated wall may be provided in an annular shape on the exterior or interior periphery of at least one flame barrier. This feature increases the effectiveness of the action to make flow more even and ensures the least possible load per unit area on the flame barrier and also on the other perforated wall.

To achieve advantageous weight and also size optimization and more economic production, at least one flame barrier may be made of aluminium or stainless strip steel.

A preferred embodiment of the present invention will be described in more detail with reference to the accompanying drawings.

DETAILED DESCRIPTION OF THE PREFERRED EMBODIMENTS

Figure 1:
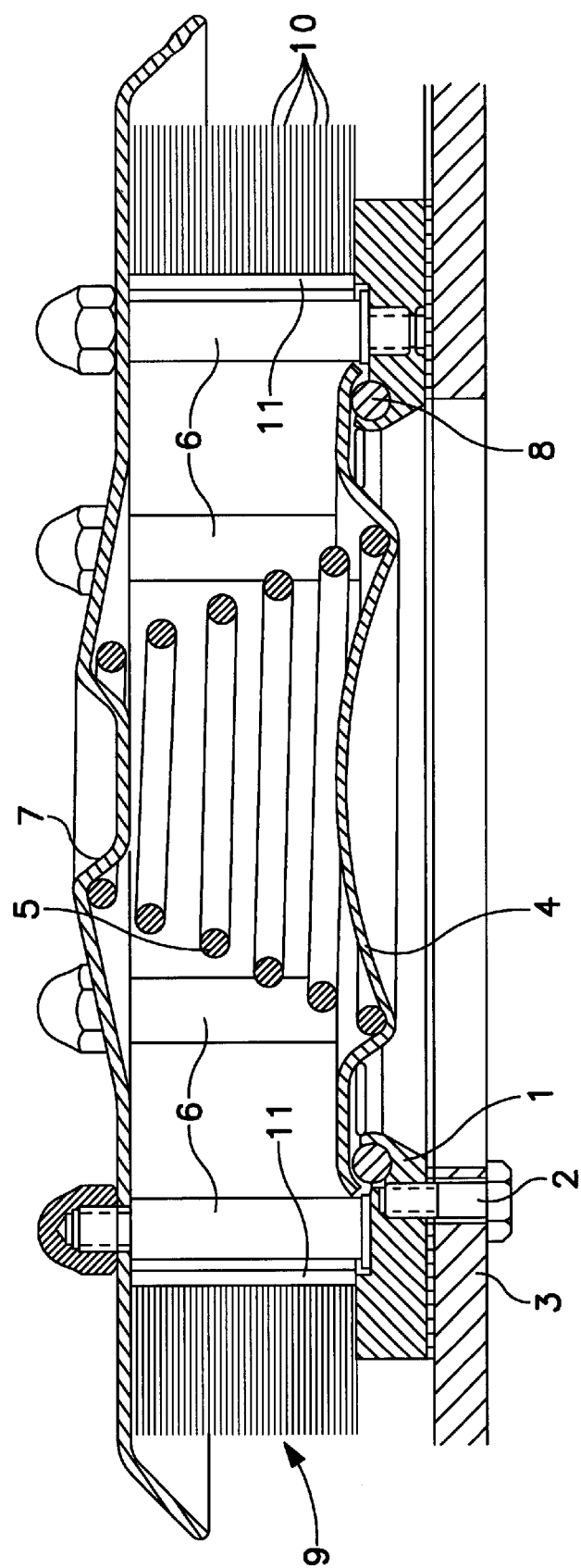
FIG. 1 is an axial center section to an explosion relief valve according to the invention.

The explosion relief valve represented in FIG. 1 is a version suitable above all for ships' engines and also diesel and gas engines for power plants, this version being installed in the crankcase or installation wall to avoid damage to the engine or installation when, specifically, gas or oil mist explosions occur. The valve consists of an annular valve seat 1 which is fixed externally by means of screws 2 or the like to an opening in the crankcase wall 3. Cooperating with the valve seat 1 is a closure plate 4 loaded by means of a helical compression spring 5 wound preferably in an approximately conical shape. In addition, stay bolts 6 are screwed into the valve seat 1 concentrically around the closure plate 4 and hold an arresting device 7 which is designed as a cover plate and has a peripheral region bent towards the crankcase deflector 3, at a distance from the valve seat 1; the bolts 6 are at the same time used for laterally guiding the closure plate 4. The helical compression spring 5 is also supported on the valve cover or guard 7. A sealing ring 8 fitted in a groove in the valve seat 1 ensures tight sealing in the closed position.

The relief valve is provided, preferably behind the valve seat 1 and the closure plate 4 viewed in the direction of flow, in a known manner with at least one flame barrier 9 positioned concentrically around the stay bolts 6, for example, the flame barrier 9 thus being in the gas path leading through the opening in the valve seat 1. The flame barrier 9 consists preferably of sheet-metal strips 10 stacked one above another, corrugated over part of their width, preferably that part nearer the centre of the valve, and loosely clamped between the valve seat 1 and the guard 7. The corrugations extend preferably over about half the width of the strips 10 and their height decreases continuously from the inside edge of the strips 10 radially outwards. If necessary, non-corrugated, flat sheet-metal strips may also be inserted between the corrugated sheet-metal strips 10.

In the embodiment of FIG. 1, there is at least one other perforated wall 11 immediately in front of the flame barrier 9, preferably in front of the first flame barrier in the case of a consecutive series of flame barriers, in addition to the flame barrier 9. This perforated wall 11, like the flame barrier 9 also preferably behind the valve seat 1 and the closure plate 4 viewed in the direction of flow, is made of expanded metal, which is known per se. The webs and perforated openings thereof may be shaped as required so as to produce, when applied to the particular geometry of the valve, a more uniform pressure characteristic and flow characteristic of the explosion gases and to slow down the flame front so that the passing of the flame barrier 9 also takes longer and the gases are therefore better able to cool down. Moreover, the perforated wall 11 gives the valve construction greater mechanical stability, with the result that smaller sizes are possible with the same safety requirements and explosions do not directly lead to damage to the valve, i.e., it remains operational.

If an explosion occurs in the crankcase, the increase in pressure thereby produced causes the closure plate 4 to be lifted off the valve seat 1 against the force of the spring 5 and to move as far as the guard 7. The valve opening of the valve is thereby freed, with the result that the explosion gases are able to flow away through the valve seat 1, the perforated wall 11 and the flame barrier 9 towards the exterior, causing a rapid release of pressure to occur in the crankcase. The perforated wall 11 causes the gases to slow down and the pressure distribution and flow to become more uniform over the whole extent of the valve, so that no excessive local pressure peaks are able to occur. The flame barrier 9 then extinguishes the flames and, due to the cooling of the gases flowing—relatively slowly because of the effect of the perforated wall 11—and the widening flow cross-section, prevents the flames from escaping to the exterior through the relief valve. The cooled gases are deflected towards the engine by the edge of the arresting device 7 which is bent towards the crankcase, so that danger to operating personnel is minimized.

Figure 2:
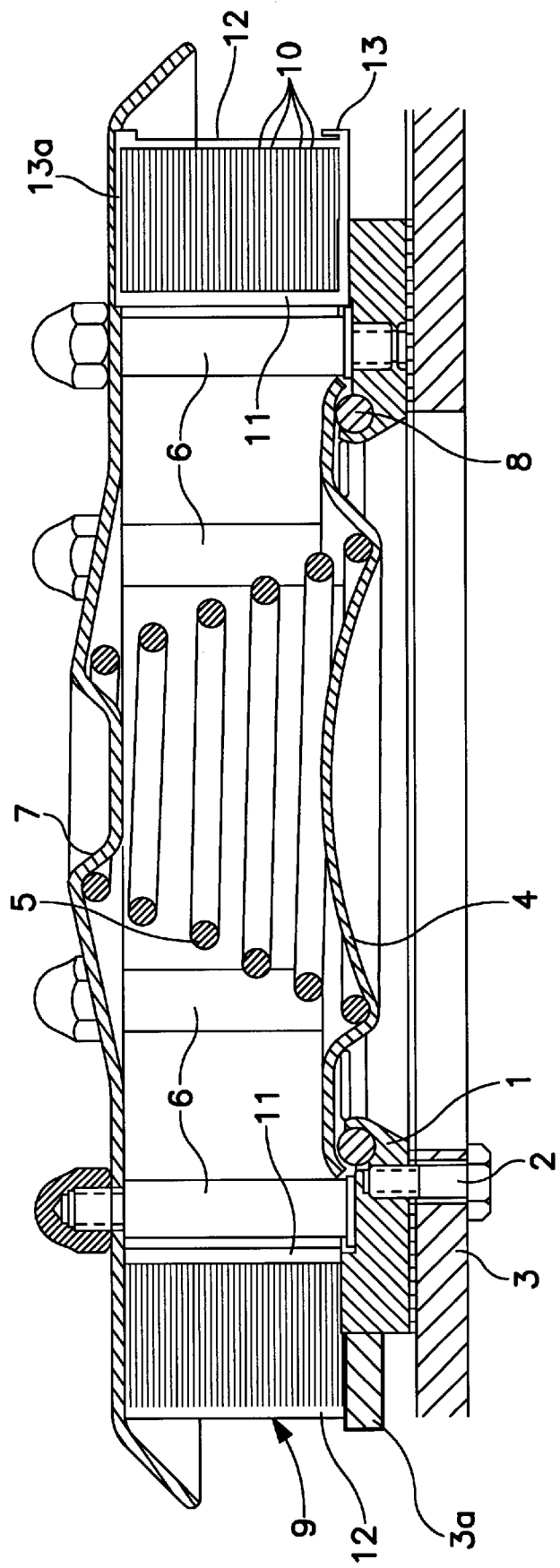
FIG. 2 is a corresponding section through a second relief valve according to the invention.

The embodiment of FIG. 2 has, as well as the perforated wall 11 positioned immediately in front of the flame barrier 9, another perforated wall 12 which is immediately behind the flame barrier 9, if necessary immediately behind the last one of a series of flame barriers. While the inner expanded metal wall 11 is preferably clamped like the sheet-metal strips 10 of the flame barrier 9 between the valve seat 1 and the guard 7, there are several attachment options for the outer perforated wall 12.

As represented on the left-hand side of FIG. 2, the valve seat 1 may have a portion 3a projecting radially outwards and the perforated wall 12 may be clamped between this portion 3a and the guard. On the right-hand side of FIG. 2 another attachment option is shown, in which the flame barrier 9 and the two perforated walls 11, 12 are joined together by means of metal rings 13, 13a flanged on the outer and inner edge to form a stack which can be handled all together, like a filter cartridge. This stack may be replaced as one piece and the stack is held in its entirety by being clamped between the valve seat 1 and the arresting device 7.

Figure 3:
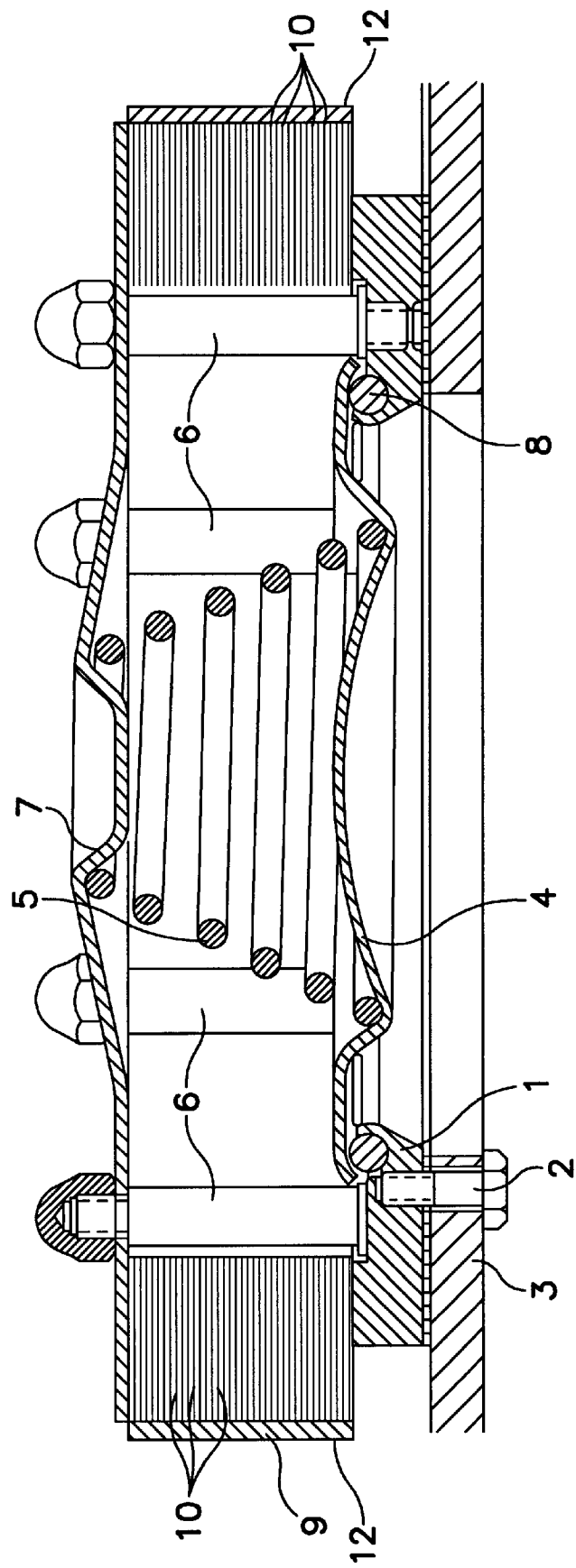
FIG. 3 is a corresponding section through a third relief valve according to the invention, showing two different arrangements.

In FIG. 3—without going into the precise manner of its attachment—a single perforated wall 12 made of expanded metal behind the flame barrier 9 is shown, the webs 12a of which are set in relation to the sheet-metal strips 10 of the flame barrier 9, and thus also the emerging gas flow, in such a way that these gases are deflected towards the installation (ie. downwards as shown in FIG. 3). This means that there is no need for any other deflecting device, specifically the edge of the guard 7 bent towards the engine or the installation, which in this case should be flat on the outer edge and whose maximum diameter should be the size of the flame barrier 9 together with the perforated wall 12. Thus, with the same dimensions of the valve seat 1, and also of the flame barrier 9, this valve requires less space or the valve seat 1 may have a larger diameter if there is available space.

The perforated walls 11, 12, like the flame barrier 9 also, are preferably manufactured from material which is a good heat conductor and advantageously is relatively light, for example aluminium or stainless strip steel. Because the valve construction is reinforced by the at least one perforated wall 11, 12, despite the light materials there is no fear of any loss of mechanical strength.

While the present invention has now been described in detail with respect to specific embodiments, changes can be made therein and still fall within the scope of the appended claims.

We claim:

1. An explosion relief valve for a confined space, comprising:
   a valve seat which may be fitted onto a boundary wall of the confined space,
   a cover plate,
   attachment means extending between said cover plate and said valve seat for positioning said cover plate in spaced relation to said valve seat and defining a gas path through said valve, a spring-loaded closure plate located between said cover plate and said valve seat for cooperating with the valve seat, at least one flame barrier having low pressure resistance installed between said cover plate and said valve seat and in said gas path, and at least one other perforated wall of expanded metal installed between said cover plate and said valve seat and in said gas path, said at least one flame barrier and perforated wall both being positioned downstream of the valve seat.

2. A valve according to claim 1, wherein said at least one perforated wall is positioned immediately upstream of a first flame barrier.

3. A valve according to claim 1, wherein said at least one perforated wall is positioned immediately downstream of a last flame barrier.

4. A valve according to claim 1, wherein an outermost perforated wall has webs set in such a way that gas flow emerging from the valve is directed towards the wall of the confined space.

5. A valve according to claim 1, wherein downstream of a last flame barrier and perforated wall the valve is free of any deflecting devices for emerging gas flow.

6. A valve according to claim 1, wherein at least one flame barrier is annular and permits throughflow over substantially 360° and at least one additional perforated wall is provided in an annular shape on an exterior or interior periphery of the annular flame barrier.

7. A valve according to claim 1, wherein at least one flame barrier is made of aluminum or stainless strip steel.

8. A valve according to claim 1, wherein the at least one flame barrier comprises sheet metal strips stacked one above another transversely to a throughflow direction of the gas.

9. A valve according to claim 8, wherein the sheet-metal strips are provided with irregular corrugations at least over part of their width.

10. A valve according to claim 1, wherein said valve is arranged for the crankcase of an internal combustion engine.

11. An internal combustion engine having a crankcase and having the valve of claim 10 into a wall of the crankcase.

12. An explosion relief valve for a confined space having a boundary wall, comprising:

a valve seat, a cover plate, attachment means extending between said cover plate and said valve seat for positioning said cover plate in spaced relation to said valve seat and defining a gas path through said valve, a spring-loaded closure plate located between said cover plate and said valve seat for cooperating with the valve seat and forming a central interior area between said closure plate and said valve seat, at least one flame barrier having a low pressure resistance installed between said cover plate and said valve seat and in said gas path and surrounding the central interior area, at least one perforated wall of expanded metal located adjacent the at least one flame barrier and between said cover plate and said valve seat, and wherein gas from within the confined space is expelled through the boundary wall, thereby forcing the closure plate to move and allow the gas to flow into an interior area and out through the at least one perforated wall and the flame barrier, the gas being cooled before being expelled into the atmosphere outside the confined space.

13. A valve according to claim 12, wherein the at least one perforated wall is positioned within the central interior area of the explosion relief valve, wherein the gas being expelled from the confined space will pass through the at least one perforated wall prior to passing through the at least one flame barrier.

14. A valve according to claim 12, wherein the at least one perforated wall is positioned adjacent the at least one flame barrier on a side opposite the central interior area, and wherein the gas being expelled from the confined space will pass through the at least one flame barrier prior to passing through the at least one perforated wall.

15. A valve according to claim 13, wherein the at least one perforated wall has a plurality of webs that guide the flow of gas emerging from the valve toward the boundary wall of the confined space.

16. A valve according to claim 12, wherein a portion of the valve that is located adjacent the at least one perforated wall and the at least one flame barrier and opposite the central Interior area is free of any deflecting devices for the expelled gas.

17. A valve according to claim 12, wherein at least one flame barrier is annular and permits the throughflow over substantially 36°.

18. A valve according to claim 12, wherein at least one flame barrier is made of aluminum or stainless strip steel.

19. A valve according to claim 12, wherein the at least one flame barrier has a plurality of sheet metal strips stacked one above another transversely to the direction of the gas flow and said strips have irregular corrugations at least over part of their width.

20. An explosion relief valve for a confined space with a boundary wall, the valve comprising:

a valve seat with a central opening;

a cover plate;

attachment means extending between said cover plate and said valve seat for positioning said cover plate in spaced relation to said valve seat and forming a central chamber;

a spring-loaded closure plate located within said central chamber and cooperating with the valve seat to form a movable closure for said central opening in said valve seat;

at least one flame barrier having low pressure resistance which is located between said cover plate and said valve seat and concentrically located about said central chamber to form a gas path through which gas escapes from said explosion relief valve;

at least one perforated wall which is located between said cover plate and said valve seat and adjacent the at least one flame barrier, said at least one perforated wall having webs of expanded metal forming perforated openings which extends from said valve seat to said cover plate so as to retard flow of gases escaping said valve; and wherein gas from within the confined space which is expelled through the boundary wall will force the closure plate to move and allow gas to flow into the central chamber, through said at least one perforated wall, and out through the flame barrier, said gas becoming cooled as it passes through the perforated wall and flame barrier.

* * * * *